UNITED STATES PATENT OFFICE.

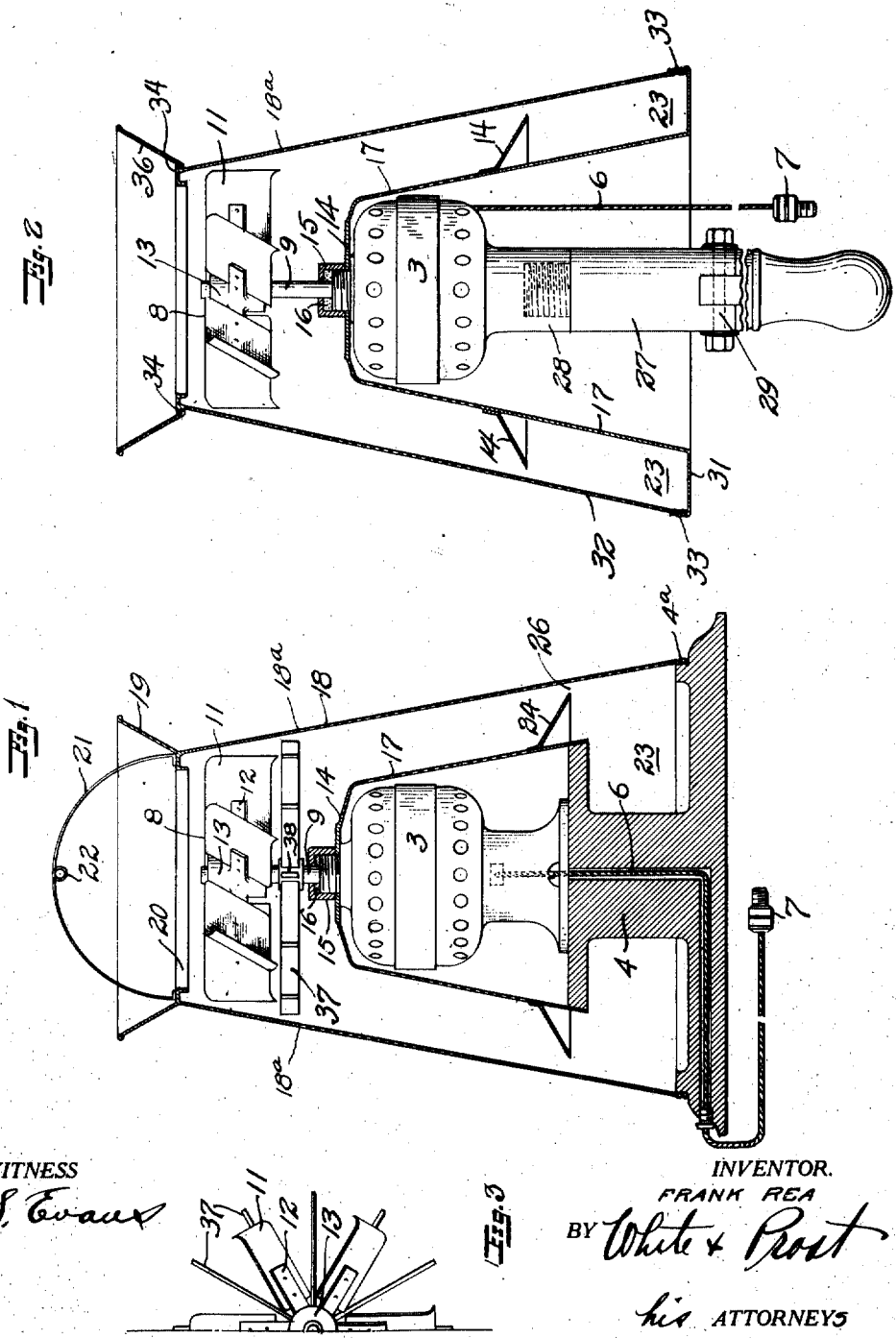

FRANK REA, OF SAN FRANCISCO, CALIFORNIA.

INSECT-DESTROYER.

1,302,972.  Specification of Letters Patent.  Patented May 6, 1919.

Application filed May 6, 1918. Serial No. 232,873.

*To all whom it may concern:*

Be it known that I, FRANK REA, a citizen of the United States, and a resident of the city and county of San Francisco and State of California, have invented a new and useful Insect-Destroyer, of which the following is a specification.

My invention relates to means for destroying insects.

An object of the invention is to provide mechanical means for catching and destroying flying insects.

Another object of the invention is to provide means for catching and destroying insects, which at the same time, may be used to exhaust foul air or odors from a room.

The invention possesses other features of advantage, some of which, with the foregoing advantage, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Broadly, my invention comprises a motor driven fan mounted in a casing. The casing is designed to provide an inlet opening adjacent the fan into which the insects are drawn with a current of air, and killed by direct contact with the blades of the fan or by being dashed into the casing. A chamber is provided in which the dead insects collect and means are provided for permitting the air to escape from the casing.

Various forms of the apparatus are provided, of which two adaptations are shown in the drawings.

Figure 1 is a vertical sectional view through a destroyer arranged on a convenient base. It is suitable for use wherever flies or other insects are wont to collect, and especially adjacent the latrines and mess tents and buildings of the soldiers' training camps, or about dairies and milk depots. Destruction of the disease carrier at the source of infection or before it has had an opportunity to communicate its deadly burden, is oftentimes the only practicable means for preventing the spread of communicable disease. The portable nature of the destroyer shown in Fig. 1 particularly adapts it for such use.

Fig. 2 is a view of the destroyer arranged upon a handle of any convenient length. This construction is particularly adapted for home use.

By disposing the destroyer in an air passage, the device combines with its other functions, that of an exhaust fan and this adaption is particularly applicable in kitchens, toilet rooms, and similar locations where odors and foul air attract flies.

Fig. 3 is a plan view of one-half of the fan and spider.

Referring first to Fig. 1, the destroyer comprises a vertical electric motor 3 mounted upon a suitable base 4. Wires 6 passing through an aperture in the base and terminating in the plug 7 provide means for connecting the motor to any convenient source of current. A fan generally designated by the numeral 8 is fixed upon the shaft 9 of the motor. The fan blades 11 are secured to arms 12 on the hub 13 and lie at a suitable angle to the plane of rotation so as to produce a current of air parallel to the axis of its rotation. In order to prevent as much as possible the centrifugal action of the fan, the blades 11 are curved forwardly in the direction of rotation at their ends. The blade is otherwise flat. It has been determined by experiment that this form of blade is quietest in operation and very efficient in preventing the centrifugal discharge of the air from the blades and in facilitating the discharge of the air from the fan axially thereof.

A smooth conical deflecting plate 14 is disposed below the fan upon the motor frame, where preferably it is held securely by the inverted cup 15 threaded upon the shaft bearing. The cup preferably contains a felt packing 16 to prevent foreign matter from being driven into the bearings. Attached to the plate 14 is a conical foraminated wall 17, the apertures therein being quite small and closely spaced so that air freely passes therethrough to cool the motor, about which the wall 17 and plate 14 form a housing. The lower edge of the wall forms a frictional slip fit with the top edge of the base 4.

An outer wall 18 is disposed upon the block and extends upwardly in the form of a cone, forming a housing about the inner housing 17 and the fan 8. The upper end of the housing 18 is provided preferably with a flaring lip 19 surrounding the intake aperture which lies immediately over the fan. A downturned flange 20 about the intake prevents eddy currents when the fan is rotating. It should be noted that the intake opening is only slightly smaller in diameter than the fan. Radially opposite the fan at the point 18ᵃ the housing 18 is continuous or solid, but from this point downwardly nearly to the bottom edge, the wall is foraminated, so that the air driven into the housing by the fan freely escapes therefrom. It will be understood, that the apertures are small enough to prevent the passage therethrough of the insect bodies. A wire bail or handle 21 is attached to the top of the housing and is provided with an eye 22 in the center upon which a bait may be hung if desired.

The outer housing is preferably removably attached to the base by means of threads 4ᵃ cut in the base, and rolled or otherwise formed adjacent the lower edge of the housing. The threads are preferably such that a half turn of the housing disengages it from the base so that it may be lifted off and the accumulated insect bodies removed from the chamber 23 formed in the base.

Means are provided for deflecting the current of air, which passes downwardly into the annular housing, outwardly through the foraminated outer wall, while at the same time the bodies of the insects are permitted to drop downwardly into the chamber 23 and lie there undisturbed by air currents. These effects are accomplished by a smooth conical plate or skirt 24 disposed about the inner housing 17 and extending outwardly and downwardly to within a short distance of the outer housing, leaving an annular space 26, through which the insects fall.

With the revolution of the fan at a suitable speed, movement of the air for a considerable distance from the fan is produced, and a decided current is created which moves with ever increasing force toward the intake. Insects caught in this current are drawn through the fan and instantly killed, the bodies being thrown downwardly into the chamber 23 and the air escaping through the walls of the housing. At suitable intervals the outer housing is detached and the dead insects removed.

In the construction shown in Fig. 2, the parts generally are relatively smaller and lighter than in the structure just described so as to permit the machine to be readily handled. The motor 3 is affixed to the end of a handle 27 which seats in the socket 28. The handle may be of any convenient length, and the wires 6 terminating in the plug 7 may pass through the handle, or hang directly from the motor as shown. Preferably a knuckle joint 29 is provided in the handle, to permit the housing to be turned to one side or the other.

The inner housing 17 is provided with an extension 31 which forms the bottom of the chamber 23, and the outer housing or wall 32 is detachably threaded into an upturned flange 33 integral with the bottom 31. Thus, the outer housing is supported by the inner one, and both together depend from the upper part of the motor frame to which the deflecting plate 14 is attached as already noted. The upper part of the housing 32 is provided with a bead 34, and a flange 36 preferably of rubber is held in position by the bead. This flange is to prevent damaging contact of the edge of the metallic housing with the walls or ceiling of the room during the use of the device.

As previously noted this construction is particularly adapted for use in houses and is operated to rid a room of flies, or other flying insects by bringing the destroyer within range of the insect so that it is caught by the air current.

If it is desired to use the destroyer in a fixed position, as in a pantry, where flies have gained access, the handle may be unscrewed and a suitable base block inserted in the socket 28 in place of the handle.

In either type of destroyer just explained it is desirable to incorporate into fans above a certain size, means for killing the insects, to supplement the fan blades in performing that function. This means consists of a spider, comprising flat thin blades 37, Fig. 1, projecting radially from a central hub 38 and fixedly mounted on the motor shaft just below the fan. No insect can be drawn through the fan and the killing blades of the spider without destruction. The spider may be made with a separate hub as shown, but under some conditions I prefer to make both fan and spider hubs integral, and the killing blades may be spaced between the fan blades.

I claim:

1. An insect destroyer comprising a housing inclosing an annular chamber and having an intake aperture and a plurality of outlet apertures therein, and means for creating a current of air and killing insects while entrained in said air current arranged in said housing adjacent said intake aperture.

2. An insect destroyer comprising a housing inclosing an annular chamber and having a foraminated wall and provided with an intake aperture, and means for creating a current of air and killing insects while entrained in said air current arranged in said housng adjacent said intake aperture.

3. An insect destroyer comprising an annular housing having a framinated wall, and provided with an intake aperture, and an axial delivery fan arranged in said housing adjacent said intake aperture.

4. An insect destroyer comprising a motor, an annular housing surrounding said motor and having an intake aperture therein, and an axial delivery fan in said housing adjacent said intake aperture and driven by said motor.

5. An insect destroyer comprising a motor, an annular housing having an intake aperture and a plurality of outlet apertures therein surrounding said motor, a fan driven by said motor arranged adjacent said intake aperture for causing a flow of air into said housing, and annular means arranged in said housing for deflecting said air through said outlet apertures.

6. An insect destroyer comprising an annular housing having a foraminated outer wall and an intake aperture, means arranged adjacent said intake for introducing a stream of air into said housing and killing insects in said stream, and means arranged on the inner wall of said housing for deflecting said stream of air through said foraminated outer wall, said housing forming a chamber below said deflecting means for the reception of said insects.

7. An insect destroyer comprising an annular housing having a portion of its outer wall foraminated and forming a chamber for the reception of said insects, means for causing a stream of air to flow into said housing, and means between said fan and said chamber for deflecting said air stream through said foraminated wall.

8. An insect destroyer comprising an annular housing having an intake aperture and a portion of its outer wall foraminated, a conical skirt arranged on the inner wall of said housing opposite the foraminated portion of said outer wall, a motor within said inner wall, and a fan driven by said motor arranged in said housing adjacent said intake aperture.

9. An insect destroyer comprising a base, a foraminated housing detachably secured to said base and having an intake aperture therein, a motor arranged on said base, an inner foraminated housing spaced from said outer wall and surrounding said motor, a fan in said outer housing driven by said motor for causing a stream of air to flow into said intake aperture, a conical deflecting plate on the discharge side of said fan for deflecting said stream of air into the annular space between said housings, and means for deflecting said air stream out of said outer housing and forming a chamber relatively free from air currents in the bottom of said housing.

10. An insect destroyer comprising a base, a foraminated housing detachably secured to said base and provided with an intake aperture, a motor on said base, a fan driven by said motor arranged adjacent the intake aperture, and means disposed about said motor for deflecting through a portion of said foraminated housing the stream of air introduced into said housing by said fan.

11. An insect destroyer comprising a base, a foraminated housing detachably secured to said base and provided with an intake aperture, a motor on said base, a fan driven by said motor arranged adjacent the intake aperture, and means disposed about said motor for deflecting through said foraminated housing the stream of air introduced into said housing by said fan, said deflecting means housing and base forming a chamber for the reception of said insects.

12. An insect destroyer comprising a housing provided with an intake aperture, a fan arranged adjacent to said intake aperture to cause a current of air to flow through said aperture into said housing and blades rigidly connected with said fan to rotate therewith for killing insects entrained in said air current.

In testimony whereof, I have hereunto set my hand at San Francisco, California, this 27th day of April, 1918.

FRANK REA.

In presence of—
C. S. EVANS.